United States Patent [19]

Hallum

[11] 3,731,699

[45] May 8, 1973

[54] SUPERSONIC POWER AMPLIFIERS

[75] Inventor: Charles E. Hallum, Irvine, Calif.

[73] Assignee: Philco-Ford Corporation, Philadelphia, Pa.

[22] Filed: Nov. 15, 1971

[21] Appl. No.: 198,840

[52] U.S. Cl. .......... 137/809
[51] Int. Cl. .......... F15c 1/16
[58] Field of Search .......... 137/81.5

[56] References Cited

UNITED STATES PATENTS

| | | | |
|---|---|---|---|
| 3,143,856 | 8/1964 | Hausmann | 137/81.5 X |
| 3,181,546 | 5/1965 | Boothe | 137/81.5 |
| 3,195,303 | 7/1965 | Widell | 137/81.5 X |
| 3,207,168 | 9/1965 | Warren | 137/81.5 |
| 3,282,279 | 11/1966 | Manion | 137/81.5 |
| 3,340,896 | 9/1967 | Mon et al. | 137/81.5 X |
| 3,410,291 | 11/1968 | Boothe et al. | 137/81.5 |
| 3,458,237 | 7/1969 | Noe | 137/81.5 |
| 3,468,326 | 9/1969 | Cohen | 137/81.5 |
| 3,537,466 | 11/1970 | Chapin | 137/81.5 |
| 3,603,334 | 9/1971 | Davies et al. | 137/81.5 |

*Primary Examiner*—Samuel Scott
*Attorney*—Robert D. Sanborn

[57] ABSTRACT

A two-way diverter valve and amplifier, for use with high velocity, high temperature gases in which relatively weak pneumatic control signals are amplified, both as to pressure and flow rate, without the use of mechanically moved parts. A bistable fluid amplifier has its branches coupled to vortex fluid amplifiers which include secondary nozzles through which fluid feeds two conduits each of which terminates in a pneumatic actuator. An additional pair of vortex amplifiers are provided which afford pneumatic pressure relief and prevent overpressure developing in the actuators.

10 Claims, 3 Drawing Figures

INVENTOR
CHARLES E. HALLUM

BY Carl H. Lymestredt
AGENT

INVENTOR
CHARLES E. HALLUM
BY
Carl H.
AGENT

SUPERSONIC POWER AMPLIFIERS

BACKGROUND OF THE INVENTION

In the practice of fluidics, an art associated with the control of gases without the use of moving elements, there has been need for an efficient device to utilize weak pneumatic signals for the control of high fluid power output. A number of devices have been devised to meet this requirement, but all have proved to have serious deficiencies. In order to obtain high power output, a high pressure energy source must be used and the pressure differential between two output ports must be as great as possible to provide the highest output force for the least potential energy loss. Some of the available devices which can be used are: subsonic fluid amplifiers (or diverter valves); supersonic fluid amplifiers; and vortex attenuators, frequently referred to as vortex power (or fluid) amplifiers. These devices may be either proportional or digital in nature; however the digital devices normally provide the greatest possible efficiency in energy transfer. Vortex valves provide reasonable flow amplification but generally little or no pressure amplification. Subsonic diverter type fluid amplifiers also provide reasonable flow gain but very little gain in absolute pressure. Supersonic diverter type fluid amplifiers provide reasonable flow and pressure gain, but a large amount of energy is wasted in leakage.

Also, in the control of gases at high temperatures and at high velocities, particularly when the devices are used in vehicles operating in a space environment, failures are encountered because the overall amplifier is sensitive to variations in load impedance. For example, such amplifiers may be completely inoperative in outer space, where no back pressure exists.

SUMMARY OF THE INVENTION

Apparatus embodying the present invention overcomes the aforesaid difficulties and is eminently suitable for use in a hostile environment since it employs no mechanically moved parts, is unaffected by vibration or acceleration and, within the limitation of materials used in its construction, is also unaffected by high temperature. Frequently temperatures ranging up to 3,000° F. are encountered and the materials used in the apparatus of this invention are chosen with this in mind.

My invention employs a two-way diverter valve and amplifier including, in novel combination, vortex fluid amplifiers so arranged that weak pneumatic control signals are amplified to effect the control of actuators, or to perform other functions requiring a substantially greater force than that obtainable directly from said signals. The apparatus of the invention is featured by the fact that it is relatively insensitive to loads imposed on or by the actuators. In brief the apparatus of the invention provides a load-insensitive supersonic power amplifier useable in a space environment, and permitting high-efficiency coupling to other fluidic elements with no matching problems.

DESCRIPTION OF A PREFERRED EMBODIMENT

Figures 1, 2:
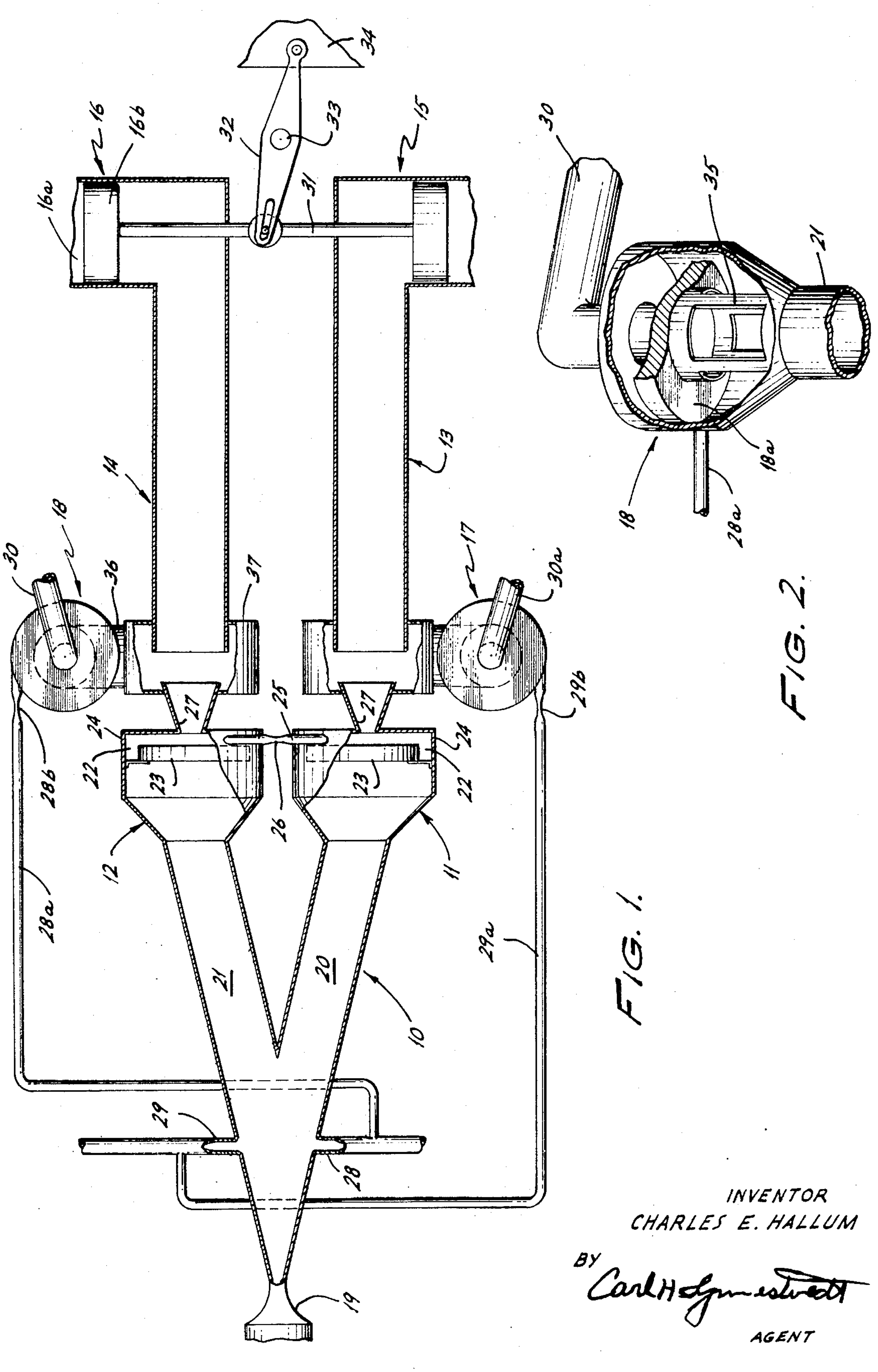
FIG. 1 is a somewhat diagrammatic elevational view, with parts shown in section, illustrating a load-insensitive supersonic power amplifier embodying the invention.
FIG. 2 is a perspective view, showing an element of the system of FIG. 1 on an enlarged scale with portions cut away to illustrate interior construction.

Making more detailed reference to the drawings, and first to FIG. 1 thereof, it will be seen that the fluid amplifier of my invention comprises a first stage supersonic amplifier 10 including branched passages and a pair of vortex fluid amplifiers 11 and 12 disposed to feed a second stage comprising a pair of conduits 13 and 14 which terminate, respectively in pneumatic actuators 15 and 16. A second pair of vortex fluid amplifiers 17 and 18 control the leakage between the first and second stages and are constructed in the manner shown in FIG. 2.

The first stage 10 comprises an inlet, or primary, nozzle 19 for receiving gaseous fluid from a gas generator (not shown) operating at high pressure. The primary nozzle 19 is effective to discharge fluid in a free stream at supersonic velocity into a pair of divergent passages 20 and 21 each of which comprises a supersonic diffuser. Passage 20 terminates in vortex fluid amplifier 11 and passage 21 terminates in vortex fluid amplifier 12. In accordance with known practice, the passages 20 and 21 are placed in use individually and selectively, as will be described. Each of the fluid amplifiers 11 and 12 has an annular inlet port 22 defined by the space between the confronting curved side wall of a generally disc-shaped member or baffle 23 and the generally cylindrical wall 24 of the vortex chamber. A cross-bleed tube 25, incorporating a restrictor nozzle 26, interconnects the annular port areas 22 and causes an acceleration of gas flow at the point of entry into that cavity which is operating at lower pressure (the cavity associated with the diverging passage which is not in use), thereby achieving a flow restricting vortex within that cavity. As a result of said tube 25 being positioned on the circumference of the cavities between the disk-shaped members 23 and the ends of passages 20 and 21, the described vortex condition presents a pneumatic barrier between passage 20 (assuming passage 21 is in use) and the outlet conduit 13. Each of the vortex fluid amplifiers 11 and 12 terminates in a secondary nozzle 27. It is through these secondary nozzles that fluid is discharged into a corresponding one of said conduits 13 and 14 which are included in the second stage referred to above.

A pair of flow control nozzles 28 and 29 are disposed opposite one another in a position to direct a fluid control stream, derived from a control signal source (not shown), transversely of the free jet region downstream of primary nozzle 19. The divergent passages 20 and 21, in conjunction with vortex amplifiers 11 and 12, comprise a bistable fluid amplifier. In operation of this first stage, and as will be understood without detailed description, high pressure gaseous fluid is introduced through primary nozzle 19. One of the control flow nozzles 28 or 29 is energized to deflect the fluid stream issuing from the primary nozzle at supersonic velocity and cause it to flow into one of the diffuser passages 20 or 21. Assuming, for example, that the nozzle 28 is fed with fluid comprising a relatively low pressure control signal, the free stream issuing from the nozzle 19 will be deflected into the passage 21, that is, into the upper passage as the apparatus is viewed in FIG. 1, through which it flows into vortex fluid amplifier 12. With the primary fluid flowing through passage 21, some gas is bled through the cross tube 25 and creates a vortex in device 11, which vortex serves to prevent any substantial flow of high pressure gas into second stage conduit 13. In this way losses through the unselected conduit are minimized. The apparatus of this first stage is described in greater detail, and claimed, in the copending disclosure of Hallum et al., bearing Ser. No. 85,510, filed Oct. 30, 1970, and assigned to the assignee of the present invention. It has the advantage that it is relatively insensitive to variation in loads imposed at the secondary nozzles 27, a characteristic which, as noted above, is of particular importance in space environment.

Referring now to the second stage, and again assuming that passageway 21 is active, the combination of nozzle 27, receiver conduit 14, and vortex chamber 18, with its vent 30, prevents deleterious overpressure developing in the output of passage 14 which energizes actuator 16. While actuators of a variety of types may be utilized in conjunction with the apparatus of this invention, I prefer to illustrate an actuator which comprises a cylinder 16*a* and a piston 16*b* connected to a cross-rod 31 coupled to drive a lever 32 which is pinned, as at 33, to produce corresponding movement of a surface or part 34 to be controlled. It will be understood that the atuator 15 includes corresponding parts, and that the position of lever 32 is determined at any instant by the positions occupied by the actuator pistons, which latter positions are, in turn, determined by the controlled flow through nozzles 28 and 29.

It is to be noted that passages 28*a* and 29*a* are connected, respectively, to control nozzles 28 and 29 deriving fluid from the latter and delivering said fluid, through suitably restricted nozzle connections 28*b* and 29*b*, whence the fluid flows tangentially into one of the corresponding vortex fluid amplifiers 17 and 18.

The preferred construction of the vortex fluid amplifiers 17 and 18 is clearly illustrated in FIG. 2, from which it will be seen that these amplifiers also includes a disk or baffle, shown at 18*a*, edges of which are spaced from the chamber walls to accommodate flow of primary fluid therearound and into the region of exhaust passage 30. The baffle 18*a* is supported by a perforated feed extension 35 of passage 21, the construction being such as to force the gas to flow radially, thence around the baffle 18*a* and to and through the vent passage 30.

With primary fluid flow diverted to passageway 21, and thence through the vortex device 12 to its nozzle 27, it will be understood that the pressure in device 12 is considerably greater than in device 11. As a result some fluid bleeds through conduit 25 into device 12, developing a vortex in the latter device as explained above. At the same time flow of control fluid occurs through passage 28*a*, and its nozzle restriction 28*b*, producing a vortex in device 18. Such a vortex in the "on" side of the second stage of the apparatus minimizes leakage of primary fluid through exhaust port 30 and maintains output from conduit 14 into actuator 16 at a high value until the pressure in said actuator nears its maximum. As maximum design pressure approaches, the flow characteristics downstream of nozzle 27 feeding conduit 14 change, permitting primary fluid to escape laterally through device 18 and its exhaust port 30. This escape takes place for the following reasons. No changes in flow or pressure are transmitted up-stream of the active nozzle 27 and, when the outlet pressure in passage 14 increases beyond the design value, the pressure recovery shock wave is forced upstream into the region of the gap between nozzle 27 and conduit 14, causing fluid to spill into vortex chamber 18 and increase the pressure in said chamber. The vortex-inducing flow entering through passage 28*a* and nozzle 28*b*, which enters tangentially into device 18, remains fixed in value and the above-described increase in fluid flow into the vortex device 18 reduces the vortex action therein and thereby provides for substantial increase in the leakage of primary fluid through passage 30. Such leakage continues until normal pressure is reestablished in actuator 16 and conduit 14. If the passage 20 is selected as the "on" side, the vortex is developed in device 12, rather than device 11, and the lower side of the apparatus then functions in the manner described above.

As is apparent from inspection of FIG. 3, which also discloses a modification to be described below, the passages and vortex amplifiers (20, 12, 18, etc.) utilized in apparatus embodying my invention most conveniently are generally cylindrical in shape, as are the control and bleed passages 28, 29, 28*a* and 29*a*. Vortex fluid amplifier 18 (as well as the amplifier 17, not illustrated) may conveniently be inserted in the flow circuit by connecting it to an inlet conduit 36 which extends laterally from a cylindrical box or connection housing 37.

Mention should be made of the fact that movement of either actuator results in equal and opposite movement of the opposite actuator. For example, with passage 21 and conduit 14 comprising the "on" side, the piston of actuator 15 will move to expel gas admitted during a previous actuation. This exhausting gas flows unobstructedly through the passage 13, the non-energized vortex chamber 17, and to the vent 30*a*. Such exhaust flow is normally prevented from entering passage 20 due to the fact that a somewhat higher pressure exists in said passage. However, during initial venting, that is immediately after the control signal is switched from nozzle 29 to nozzle 28, pressure at conduit 13 may be somewhat higher than the pressure in passage 20. Under such condition initial flow from conduit 13 through its confronting nozzle 27 and to passage 20 may occur. Any fluid which flows in this reverse fashion will enter the "on" passage 21 and will flow therethrough at high velocity to the outlet conduit 14, being converted to useful working fluid.

Figure 3:
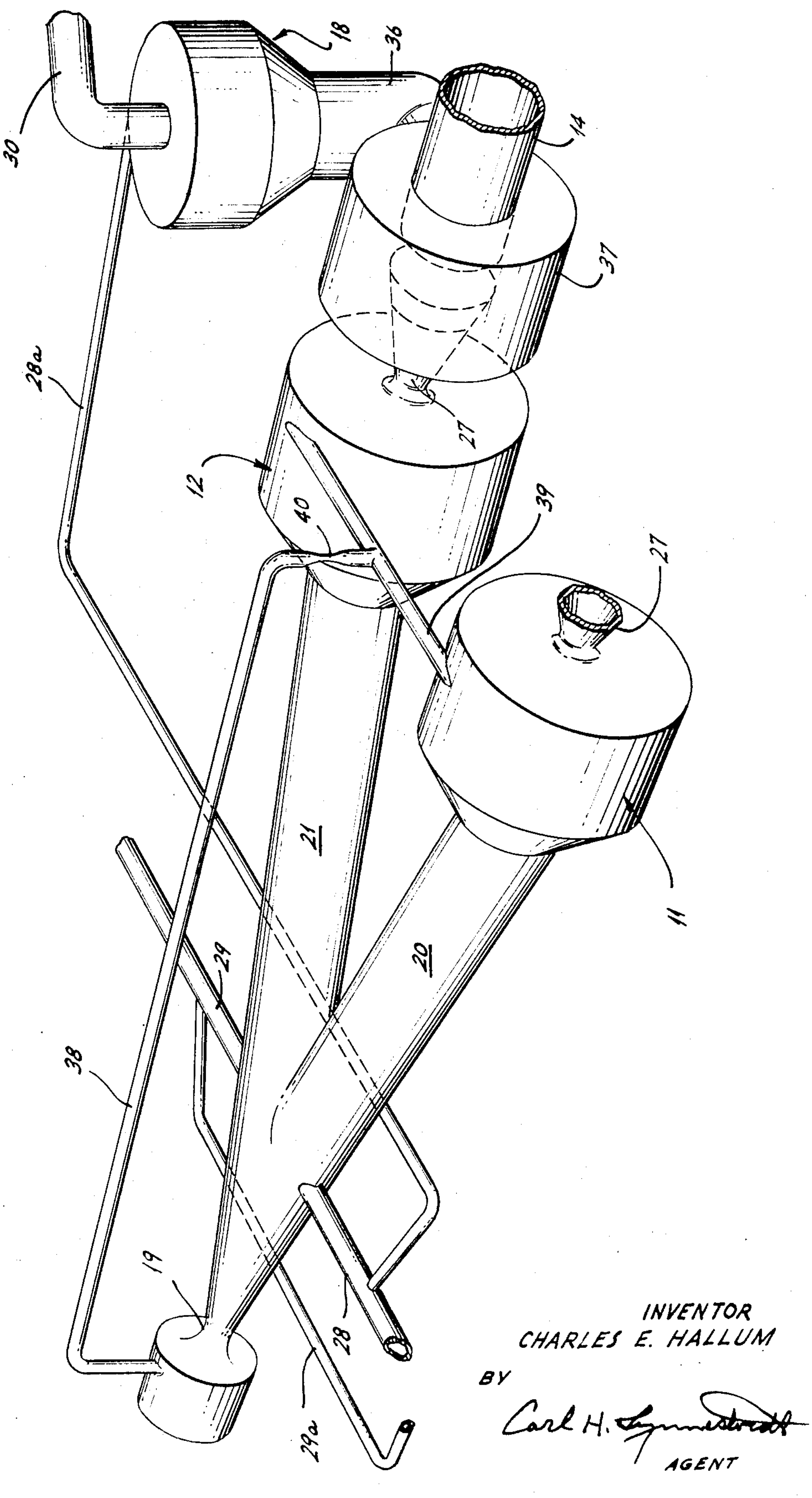
FIG. 3 is a perspective view illustrating apparatus of the type shown in FIG. 1 and also including a modification contemplated by the invention.

Also illustrated in FIG. 3 is a cross-bleed booster passage 38 which may be used for the purpose of improving amplifier efficiency. This passage is connected to derive pressure from a region just upstream of the primary nozzle 19, and to inject said fluid into the cross-bleed passage 39 through a metering restriction 40. The impedance of metering restriction 40 is so chosen that the pressure in cross-bleed passage 39 is maintained at about the same pressure as exists in the higher pressure passage of the supersonic diverter. The effect is that the tangential injection pressure in the cross-bleed passage 39 is increased, thereby improving the vortex action in the "off" side of the diverter valve. The pressure in passage 39 can, of course, be adjusted by changing the size of metering restriction 40.

As will be understood, apparatus in accordance with this invention will be subject to high temperatures and it has been found that materials in the tantalum/tungsten group, as well as columbium alloys or ceramics, can be used to advantage.

I claim:

1. In a fluid amplifier: a primary nozzle for receiving fluid at relatively high pressure and for discharging the same at high velocity; means forming a pair of divergent passages arranged to receive fluid discharged by said primary nozzle; control means for developing a fluid flow to deflect the free stream issuing from said primary nozzle and thereby effect flow through the passages of said pair, selectively; each passage having a vortex fluid amplifier including a secondary nozzle through which the fluid is discharged; a pair of conduits each disposed to be fed by a corresponding one of said secondary nozzles and each terminating in a pneumatic actuator; and means for preventing deleterious overpressure developing in said actuators, said last means comprising a pair of vortex fluid amplifiers each disposed to be fed by a corresponding one of said secondary nozzles, each of the last recited vortex fluid amplifiers including a vortex-inducing port and an exhaust port, and means for conducting fluid to the vortex-inducing port of the vortex fluid amplifier associated with the selected passage, thereby to develop a vortex and minimize flow through said exhaust port until the pressure in said actuator exceeds a predetermined value.

2. A fluid amplifier in accordance with claim 1, and further characterized in that the vortex-inducing port of each of said pair of amplifiers comprises a flow restrictor.

3. A fluid amplifier in accordance with claim 2, and further including means for deriving the fluid conducted to said flow restrictors from said control means.

4. A fluid amplifier in accordance with claim 1, and further including conduit means providing for cross-bleeding of fluid between said vortex fluid amplifiers which include a secondary nozzle.

5. A fluid amplifier in accordance with claim 4, and in which said conduit means includes a flow restrictor.

6. A fluid amplifier in accordance with claim 4, and further including restricted passage means for deriving fluid from the region of said primary nozzle and delivering said fluid to said conduit means.

7. A fluid amplifier in accordance with claim 1, and further characterized in that each of said passages includes a portion comprising a supersonic diffuser and said primary nozzle is effective to discharge fluid at supersonic velocity.

8. In a fluid amplifier: a nozzle for receiving primary fluid at relatively high pressure and for discharging same at high velocity into a pair of divergent passages each of which terminates in a vortex fluid amplifier including a secondary nozzle through which the fluid is discharged; control means for developing a flow of secondary fluid and for delivering it across the path of the free stream of primary fluid issuing from said nozzle to effect flow through the passages of said pair, selectively; a pair of conduits each having one end spaced from a corresponding one of said secondary nozzles to form a leakage gap, at least one of said conduits having its other end associated with a pneumatically-actuated device; vortex fluid amplifier means having a vortex-inducing port and an exhaust port, said amplifier means being so disposed with respect to the gap of said one conduit as to receive primary fluid leaking from that gap; and means for conducting secondary fluid to the vortex-inducing port of said amplifier means to induce a vortex therein and substantially prevent such leakage of primary fluid until the pressure at the associated device exceeds a predetermined value.

9. A fluid amplifier in accordance with claim 8, and further characterized in that the vortex-inducing port of said amplifier means comprises a flow restrictor.

10. A fluid amplifier in accordance with claim 9, and further including means for deriving the secondary fluid conducted to said flow restrictor from said control means.

* * * * *